United States Patent [19]

Schoerkmayr

[11] Patent Number: 4,730,533

[45] Date of Patent: Mar. 15, 1988

[54] ELECTRONIC KEYBOARD INSTRUMENT

[76] Inventor: Josef Schoerkmayr, Annenstrasse 50, A-8020 Graz, Austria

[21] Appl. No.: 901,336

[22] Filed: Aug. 28, 1986

[30] Foreign Application Priority Data

Aug. 29, 1985 [AT] Austria .............................. 2528/85

[51] Int. Cl.[4] .............................................. G09B 15/02

[52] U.S. Cl. .................................. 84/478; 84/470 R; 84/477 R

[58] Field of Search ................ 84/478, 470 R, 477 R, 84/1.01, 1.03

[56] References Cited

U.S. PATENT DOCUMENTS

| | | | |
|---|---|---|---|
| 2,788,699 | 4/1957 | Pipkin | 84/477 R |
| 3,377,716 | 4/1968 | Schmoyer | 84/478 |
| 3,731,582 | 5/1973 | Gullickson | 84/478 |
| 3,837,256 | 9/1974 | Gullickson | 84/478 |
| 3,881,390 | 5/1975 | Gullickson | 84/478 |
| 3,895,555 | 7/1975 | Peterson et al. | 84/477 R |
| 4,061,072 | 12/1977 | del Castillo | 84/478 |
| 4,286,495 | 9/1981 | Roof | 84/477 R |
| 4,480,521 | 11/1984 | Schmoyer | 84/478 |

*Primary Examiner*—Stanley J. Witkowski
*Attorney, Agent, or Firm*—Cushman, Darby & Cushman

[57] ABSTRACT

A keyboard instrument having a plurality of keys which upon actuation each generate a tone correlated to the respective key, and having a plurality of optical display means on each of said keys, said display means indicating the sequence of the keys to be actuated.

14 Claims, 4 Drawing Figures

ELECTRONIC KEYBOARD INSTRUMENT

The invention relates to an an electronic keyboard instrument having an optical display (e.g. digits or numbers) of the consecutive tones. Generally speaking, the invention also relates to a method of marking a plurality of keys of a keyboard instrument according to a melody to be played as represented by a plurality of notes.

Electronic keyboard instruments have been known for a long time. They essentailly comprise a keyboard, tone generating means and a loudspeaker. For example, like with a piano, each key is associated with a specific tone. If, for example, a "c"-key is actuated the corresponding c-tone is generated by the tone generating means and the loudspeaker is accordingly actuated. This applies for all keys.

The use of a keyboard instrument, however, is not particularly easy for many people, because frequently they cannot read notes. Further, it is difficult for many people, particularly disabled or retarded people, to find the transition from the printed notes to the corresponding keys on the keyboard instrument.

The present invention has as an object to provide an electronic keyboard instrument which can also be used by musically less gifted people, beginners and also by disabled or retarded persons. Particularly with disabled or retarded persons the experience is that by actively performing music the disease can be relieved or sometimes even cured. This applies in particular to persons having a cerebral diseased condition.

The invention is based on the discovery that the sequence of tones of a melody can be displayed directly on the keys of the keyboard instrument whereby the player merely has to actuate the keys, for example corresponding to a sequence of numbers, to generate the corresponding melody. The player knows the rhythm and possibly the melody of the song played by him or her so that merely through the displayed tone sequence he or she is enabled to even play complicated melodies.

In accordance with the present invention a keyboard instrument is provided having a plurality of keys which upon being actuated each initiate production of a tone correlated to the respective key and having a plurality of optical display means on each of said keys -or associated with each of said keys,- said display means indicating the sequence according to which they have to be actuated.

Preferred embodiments of the invention are specifically described in the claims.

In the following the invention is further described with reference to drawings. In the drawings.

Figure 1:
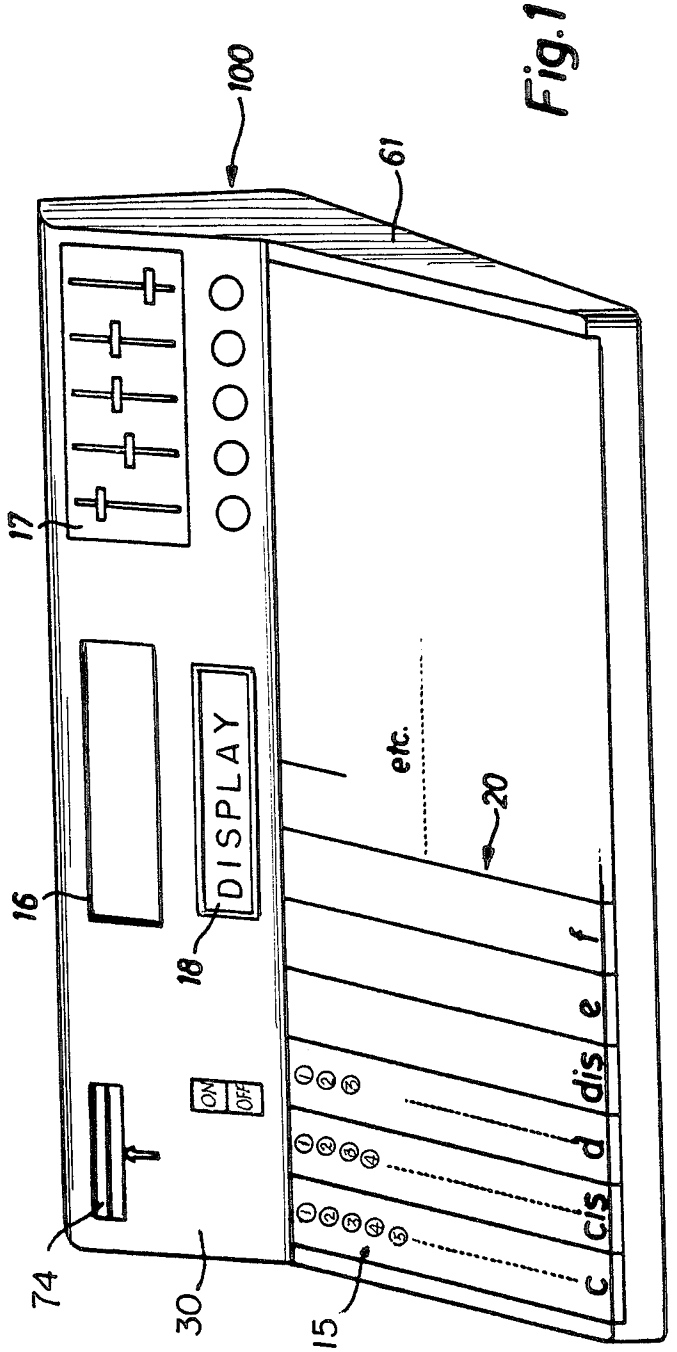
FIG. 1 shows a schematic perspective view of a keyboard instrument according to the invention.

With reference to FIG. 1 a short overview of the invention is given hereunder.

The "no problem music keyboard" is an electronic keyboard instrument which in view of its easy operation is particularly suited in the musical therapy of disabled or retarded adults and children. But also people who up to now were not in a position to play a keyboard instrument are given the opportunity to learn playing melodies with said keyboard instrument because of the novel technique used herein.

This keyboard preferably on the basis of a synthesizer is a musical instrument having an optical number display of consecutive tones.

Shortly speaking the keyboard instrument 100 according to FIG. 1 has as its characteristic that each of the keys, which should preferably be of transparent material (glass, transparent plastic, for example transparent polystyrene, acrylic plastic etc.) has integrated therein an electronic digital number system 15. The keyboard 20 comprises all full or half tone steps of the different musical keys (c, c major, d, d major, e, f, f major, . . . etc.), preferrably omitting the keys which correspond to the black keys of a piano. By omitting the black keys the operation of instrument 1 is simplified in said case.

The number sequence at the same time is the tone sequence of the melody (1-2-3-4 . . . etc.). The electronic digital number or figure system 15 must be arranged one beneath the other on each key because the respective tone may occur several times in the melody (for example tone F can occur as Nos. 4, 5, 9, 10 and 12 of the melody). Preferably, as soon as the respectively numbered key has been actuated the numer-display means is turned off again in order not to confuse the player.

For models of keyboard 1 which are particularly adapted for disabled or retarded people it is recommended to have the number sequence not exceed the number 10. After 10 the instrument computer switches the number sequence directly back to number 1 which then is actually number 11.

Specifically, transparent keys, which comprise all full and half tone steps of the musical keys can be used.

Digitally illuminated neon letters show the correct tone sequence, that is the melody sequence, by means of numbers. After actuating the correspondingly lit number (i.e. the key having display means thereon or associated therewith) the same (i.e. the display means showing the number) is turned off again.

A return knob 30 is actuated for the purpose of a new start. It reilluminates the complete sequence of numbers.

A chip programming means causes after insertion of a corresponding chip that the desired number sequence, that is tone sequence, is illuminated. Different kinds of music (jazz, folk music etc.) can be programmed.

Display 18 indicates the respective piece of music (title, musical key etc.).

The rhythm computer 16 serves to assist the player. Thereby the player can learn to play the melody faster in the right rhythm (the rhythm must be found by the player himself).

Equalizer 17 allows different sound settings like with normal keyboards.

Basically two modes of operation exist:

1. Simple mode of operation: The keys are actuated in the correct sequence of notes, the number sequence is illuminated and the player can follow playing the melody (the instrument can be built with an integrated rhythm computer).

2. Embodiment having chip programming: In the different chips melodies are stored and can be read from a display and show the right number sequence (that is tone sequence). (The instrument can also be built with an integrated rhythm computer.)

In the following an embodiment of the invention is described with reference to FIGS. 2 to 4.

Figure 2:
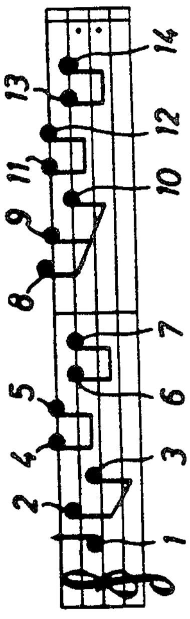
FIG. 2 illustrates a tone example of a song composed by the applicant for physically disabled or mentally retarded people.

In FIG. 2 a melody is indicated in the usual manner using notes, with the individual notes being numbered from 1 to 14.

Figure 3:
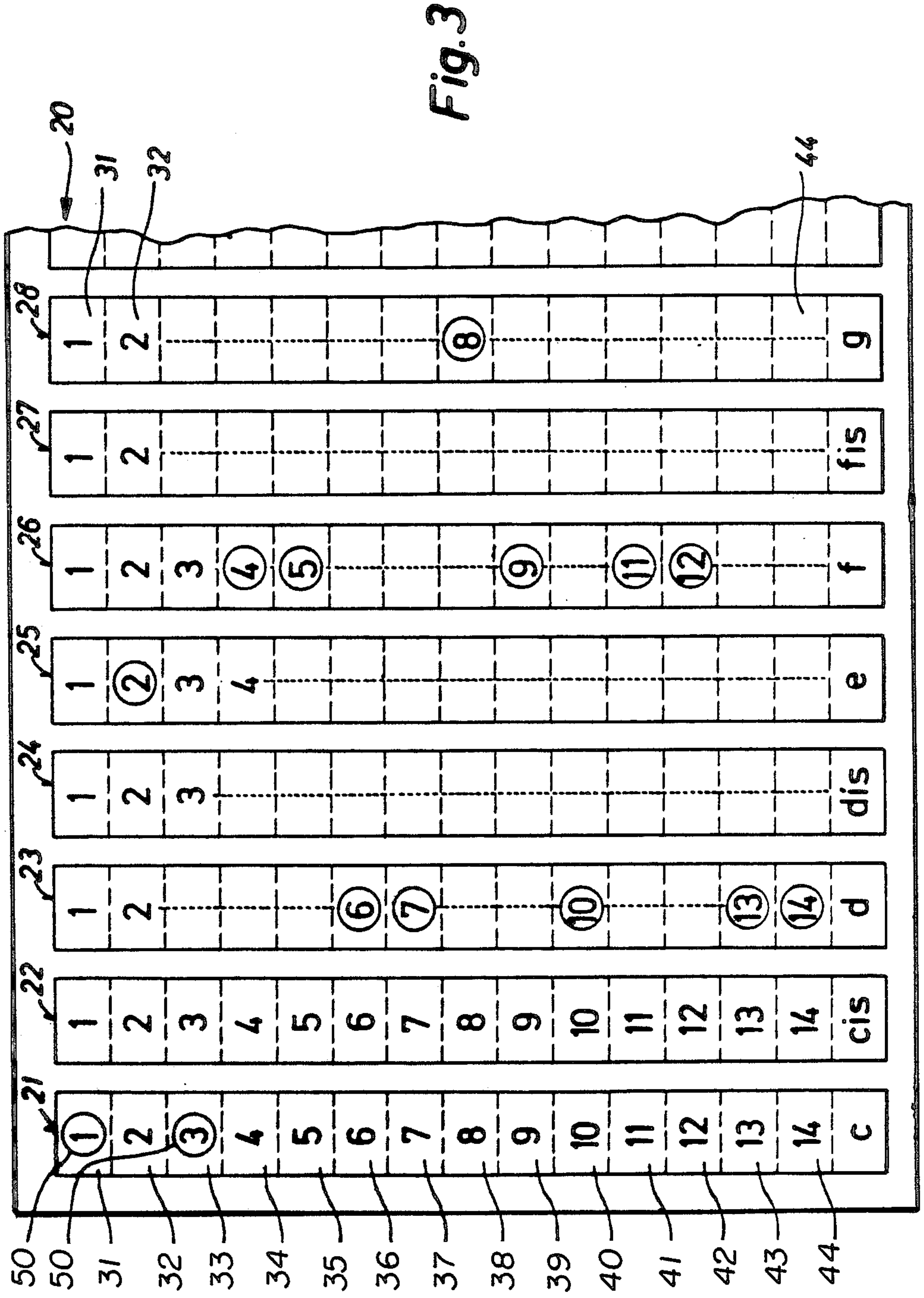
FIG. 3 is a schematic partial top view of the keyboard of the keyboard instrument.

In FIG. 3 a segment of the keyboard 20 of FIG. 1 is shown wherein specifically only the keys 20 to 21 are illustrated (in a top plan view) which are necessary to play the melody of FIG. 2.

Each of the keys 21 to 28 (which correspond to the notes c, c-major, d, d-major, e, f, f-major and g) has a plurality of optical display means. The optical display means are designated for key 21 with numerals 31, 32, 33 . . . 44). The other keys, for example key 22 etc., have similar optical display means 31 to 44, for example in the case of key 28 optical display means 31,32, and 44 are referred to by reference numerals.

The optical display means serve to indicate the sequence 1 to 14 of the notes of the example of FIG. 2 to the player.

All optical display means can be either turned on or off. In the example of FIG. 3 the display means 31 which are at the very top of each corresponding key, are suited to represent a number 1. The display means 32 which are directly below on each respective key can represent a number 2 in the illumated state, etc. This applies for all keys.

The sequence 1, 2, 3, 4, . . . 14 in FIG. 3, which goes from top to bottom could also be provided in an inverse direction, namely from bottom to top. The inverse arrangement not shown is preferred.

In FIG. 3 a circle 50 around the numbers indicates that the corresponding optical display means have been switched on or actuated, that is the number represented by the display means is illuminated, for example. Of course, any other way of indicating an actuated number, for example by colour change or creation of a colour before a white or black background, is suitable.

The optical display means 31 to 44 can be constructed in different ways. For example, the optical display means can comprise a small bulb which is covered by a disk provided with the corresponding number. If the bulb is turned on, the player will see the corresponding number. If the bulb is turned off, the player cannot recognize the number. The optical display means can also utilize light emitting diodes (LED's) for example. In all instances a number is used to mark the key to be actuated next by the player, which in the illustrated working example corresponds, for example to numbers 1 to 14. It would be possible, of course, to utilize other means to characterize the sequence, for example to utilize a sequence of letters etc. Numbers are preferred, because mentally retarded people are more familiar with number sequences. In the case of strongly mentally retarded, who, for example, can only count up to 3, it is possible to use only three different optical display means per key, that is to utilize numbers. 1 to 3, in which case, whenever the third key has been actuated, there is an automatic switch-back to 1.

In FIG. 3 the numbered melody of FIG. 2 has already been programmed which can be seen from the applied rings or circles 50 mentioned previously. Due to said programming on key 21 numbers 1 and 3, on key 23 numbers 6, 7, 10, 13 and 14, on key 25 number 2, on key 26 numbers 4, 5, 9, 11 and 12 and on key 28 number 8, are illuminated.

At the beginning of the play performed by someone inexperienced or disabled or retarded, all numbers marked by ring 50 are illuminated. The player knows that firstly he must actuate key 21 (C), secondly key 25 (E), thirdly key 21 again, and fourthly key 26 (F), and so on.

Figure 4:
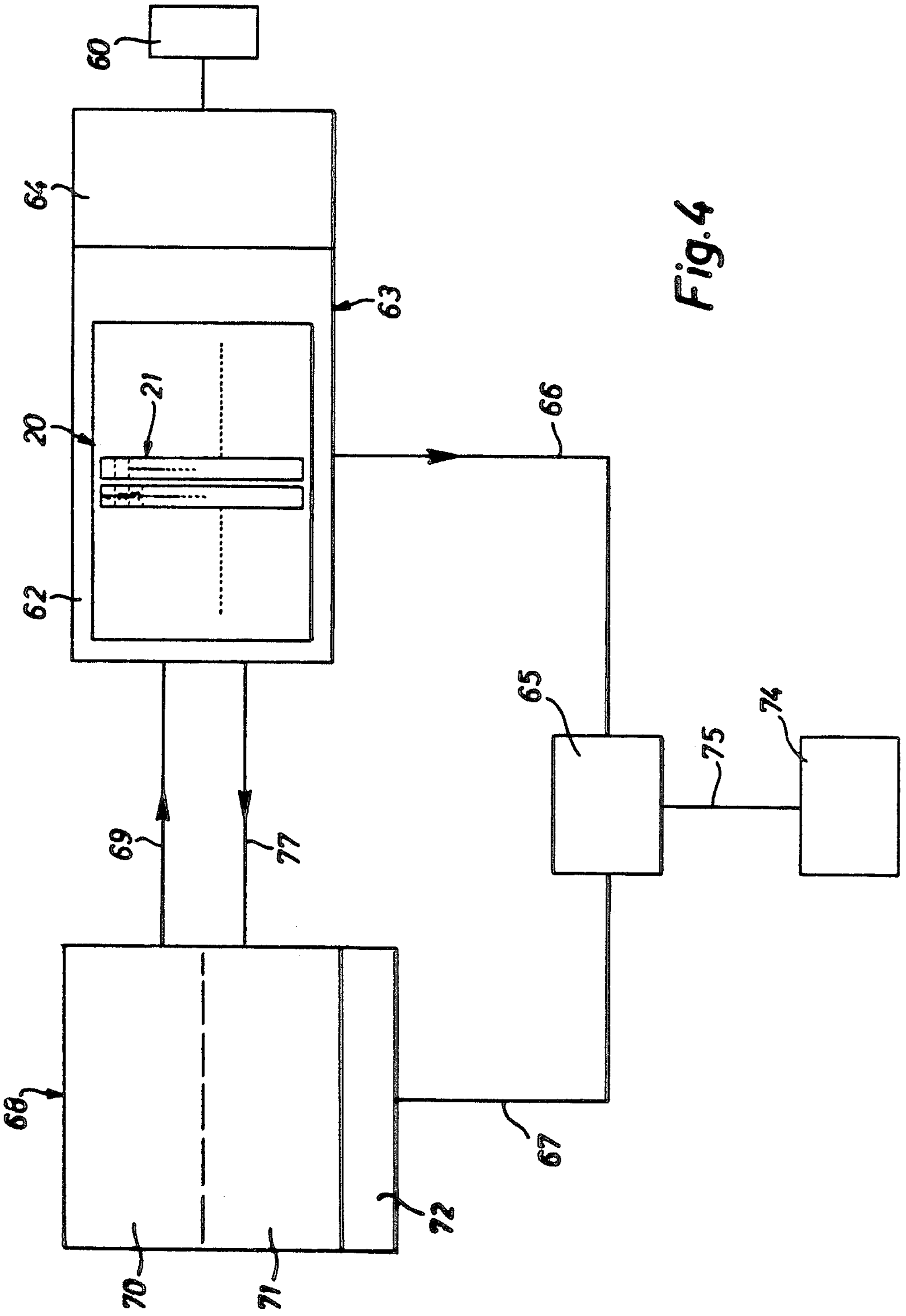
FIG. 4 is a block circuit diagram of the keyboard instrument according to the invention.

FIG. 4 illustrates the construction of the keyboard instrument 100 according to the invention. All building blocks shown in FIG. 4, with the exception of loudspeaker 60, can be incorporated into housing 61 of the keyboard instrument 100 shown in FIG. 1.

In FIG. 4 specifically the keyboard 20 is shown comprising said keys, of which only key 21 is designated. Keyboard 20 is connected with a keyboard electronic 62 which, as schematically shown in FIG. 4, surrounds keyboard 20. Keyboard 20 and keyboard electronic 62 will be referred to as keyboard electronic means 63. Keyboard electronic means 63 generates tone signals upon pressing down corresponding keys which through an amplifier 64 are fed into the already mentioned loudspeaker 60 so that corresponding tones are formed.

According to the invention it is necessary to program said optical display means 31 to 44 which are preferably provided on said keys 21 to 28 (or are assigned to said keys in a reasonably close physical relationship), that is the keys which have to be actuated in accordance with a melody to be played by a student or disabled or retarded person. This so-called programming can either be performed manually by actuating the keys 21 etc. or automatically, for example by means of a chip which contains corresponding information about the melody.

Besides said means for programming the invention further provides means which cause the optical display means during the play, that is upon actuating the keys, to be turned off after the corresponding key has been actuated.

It is also possible to provide said latter means such that the display means are not switched off after the appropriate key has been actuated.

Further the invention provides back-switch- means by which after a certain number (14 in the shown embodiment) has been reached by the display means the illumination or actuation of the remaining keys is switched back to the beginning, that is the operation is restarted with number 1. In other words the back-switching means ensure that because of a frequent actuation of a given key, for example of key 21, a melody can nevertheless be played to the end. Should, for example, the tone "c" unfortunately occur 14 times at the beginning of the melody and soon thereafter for the 15th time, a switch must be performed in time to indicate to the user that key 21 is to be actuated for the 15th time. Preferrably the switching means are constructed such that they already induce the switching process before the final number (for example 14) has been reached. If, for example, only 3 or 4 display means 31, 32, 33 are used per key, such switching must be performed more frequently.

To program the optical display means 31, 32 ... of the different keys 21 . . . the following is of importance.

In the case of a manual programming a programming selection switch 65 is switched to manual. Thereby a lead 66 from keyboard electronic 62 is connected through programming selecting switch 65 with lead 67 which is connected with an electronic control means 68. Electronic control means 68 are in turn connected with keyboard electronic 62 via a lead 69.

It should be mentioned already here that a chip programmer or a chip programming means 74 is connected with programming selection switch 65 through a lead 75. This is referred to in greater detail below.

Preferrably a programming control 70, play control means 71 and a programming/play switch 72 form part of the electronic control means 68.

For the programming case being discussed here the programming/play switch 72 is in a state where the information fed to lead 67 is forwarded to programming control 70.

Hereinafter the manual programming is described in greater detail. To program the melody shown in FIG. 2 into the optical display means 31 etc., for example the teacher or the student will himself or herself press down key 21. Thereafter control means 68 is provided with information with respect to the actuation of key 21 via lead 66 and 67, and control means 68 provides through its programming control 70 a signal through lead 69 to the optical display means 36 so that the same are turned on. Suitable means are provided to maintain optical display means 31 in their turned on stage even after key 21 has been released again. Next key 25 is pressed down where optical display means 32 are turned on to represent number 2.

In the same manner next key 21 is pressed down again to turn on optical display means 32 as well to form the sequence of numbers. It is clear that control means 68 comprise suitable means to turn on in accordance with note sequence 1, 2, 3, 4 . . . etc., the corresponding optical display means 31 on key 21, 32 on key 25, 33 on key 21 etc. For example counting means can be provided in the control means for this purpose. Generally it is also possible to employ a microprocessor which processes the information correspondingly and issues the necessary commands.

After all fourteen notes have been inputed in this manner and the corresponding optical display means have been turned on, it is possible to switch to the play mode by actuating programming/play switch 72.

Before the playing operation is described in greater detail the automatic programming is shortly described. Here it is not necessary to press down the individual keys because the corresponding information is stored, for example in a chip card which is inserted into chip programmer 74. The chip programmer reads the information with respect to the notes and their sequence from the chip and provides this information via lead 75 to lead 67 when the program selection switch 65 is in its position for the chip programming. Based on the information provided by the chip the electronic control means 68 actuate in the same manner as in the case of mechanical programming the optical display means so that they are switched on in accordance with the melody.

To start the playing mode the programming/play switch 77 is switched to the play operation. The player can then press down or actuate the keys in the indicated sequence. Information with respect to the actuated keys can be furnished via lead 77 to the electronic control means 68. With the aid of turn-off means in the electronic control means 68 the corresponding display means can be switched off after actuation of the key whose display means indicated the requirement for such actuation. It is also possible not to provide such reset after actuating the key.

Further, information with respect to the number of keys already actuated is provided to the electronic control means via lead 77 so that the electronic control means can switch back to number 1 in time.

In playing a melody indicated by the optical display means it is possible that the player inadvertantly presses the wrong key. It could be, for example, that after actuating key 25 to play the second note the player does not actuate key 21 (where number 3 is lit) but, for example key 26, where number 4 is lit.

The invention provides two possibilities to avoid any drawbacks connected therewith.

According to one example monitor means are provided in the electronic control means which continuously monitor which key was pressed and which key should be pressed next. If then not the right key, in the named example key 21, is pressed, but rather a wrong key, in the present example 26, the wrong actuation of key 26 is indicated for example by an optical or acoustic signal. At the same time (if this is the selected mode of operation) the corresponding optical display means are not turned off, in the present example the optical display means 34 of key 26.

Another possibility in the case of an erronous actuation of a key is that after the wrong actuation in the case of a mode of operation where already used optical disply means are turned off, the original programming automatically returns, that is also the display means already turned off are turned on again.

The key board instrument 100 according to the invention can also be in the form of an electronic organ or piano.

Instead of a chip of course any other memory means can be used.

What is claimed is:

1. A keyboard instrument comprising:

a plurality of keys each of which produces a tone upon being actuated which is correlated to the respective key;

a plurality of optical display means on each of said keys; and means for simultaneously activating a plurality of said optical display means, each said simultaneously activated optical display means including means for indicating a sequence in which the respective keys are to be actuated.

2. The keyboard instrument of claim 1, wherein said means for indicating include means for indicating numbers in a predetermined numeric sequence.

3. The keyboard instrument of claim 2, wherein said numbers represent 1 for the first key to be actuated and 2 for the second key to be actuated up to n for the $n^{th}$ key to be actuated, n being an integer of up to 30.

4. The keyboard instrument of claim 3, wherein the optical display means representing said numbers increase in their numerical values in a direction away from the user of said instrument.

5. The keyboard instrument of claim 3, wherein the optical display means representing said numbers decrease in their numerical values in a direction away from the user of said instrument.

6. The keyboard instrument of claim 1, wherein said optical display means are arranged on each key in the longitudinal direction of said key.

7. The keyboard instrument of claim 1, wherein each key has up to ten optical display means representing the numbers 1 to 10.

8. The keyboard instrument of claim 1, wherein each key has up to twenty optical display means representing the numbers 1 to 20.

9. The keyboard instrument of claim 1, wherein electronic control means are provided which cause said optical display means to be turned on or off.

10. The keyboard instrument of claim 1, wherein keyboard electronic means are provided generating tones correlated to respective actuated keys and providing information about the actuated keys to electronic control means serving to turn off/on said optical display means.

11. The keyboard instrument of claim 1, wherein means are provided to switch between a play operating mode and a programming operating mode, and wherein electronic control means are provided which for programming are actuated either manually by said keys or by a memory containing the necessary information.

12. The keyboard instrument of claim 11, wherein said memory is a chip.

13. The keyboard instrument of claim 1, wherein means are provided which turn off said optical display means when the corresponding key has been actuated.

14. The keyboard instrument of claim 1, further comprising means to switch between a play operating mode and a programming operating mode, electronic control means which in accordance with programming signals turn on/off optical display means on said keys corresponding to the tone sequence, means for cyclic switch-back of said optical display means to the starting play mode before the last signal from the display means of the play cycle has been actuated.

* * * * *